Jan. 7, 1958 P. L. CERONE 2,819,087

PICK-UP DEVICE FOR RECORD PLAYERS

Filed June 21, 1952

INVENTOR.
Pasquale L. Cerone
BY D. Emmett Thompson
Attorney 2,819,087
Patented Jan. 7, 1958

2,819,087

PICK-UP DEVICE FOR RECORD PLAYERS

Pasquale L. Cerone, De Witt, N. Y.

Application June 21, 1952, Serial No. 294,803
2 Claims. (Cl. 274—23)

This invention relates to pick-up devices for record players. At the present time, the tone grooves are cut in most records with the undulations in the side walls of the grooves, whereby lateral vibration is transmitted to the stylus as distinguished from the hill and dale method wherein the undulations are formed in the bottom wall of the groove. It is desirable to have a minimum of pressure on the stylus to prevent unnecessary wear in the tone grooves of the record. If this pressure is slight, the stylus is often thrown out of the tone groove at points where the undulations are of greater magnitude and have a low frequency. This is especially true where the undulations are cut in the side walls of the groove.

This invention has as an object a pick-up device embodying a structural arrangement whereby the tone arm is counterbalanced, or otherwise arranged, to produce only a very slight downward pressure of the stylus against the record but which will not vibrate laterally, or vertically, to cause the stylus to leave the tone groove. The arrangement also minimizes tone arm resonance.

The invention consists in the novel features and in the combinations and constructions hereinafter set forth and claimed.

In describing this invention, reference is had to the accompanying drawings in which like characters designate corresponding parts in all the views.

Figure 1:
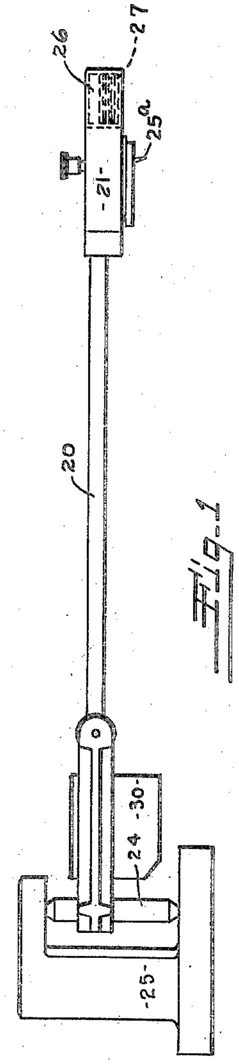
Figure 1 is a side elevational view of the pick-up device embodying my invention.
Figure 2:
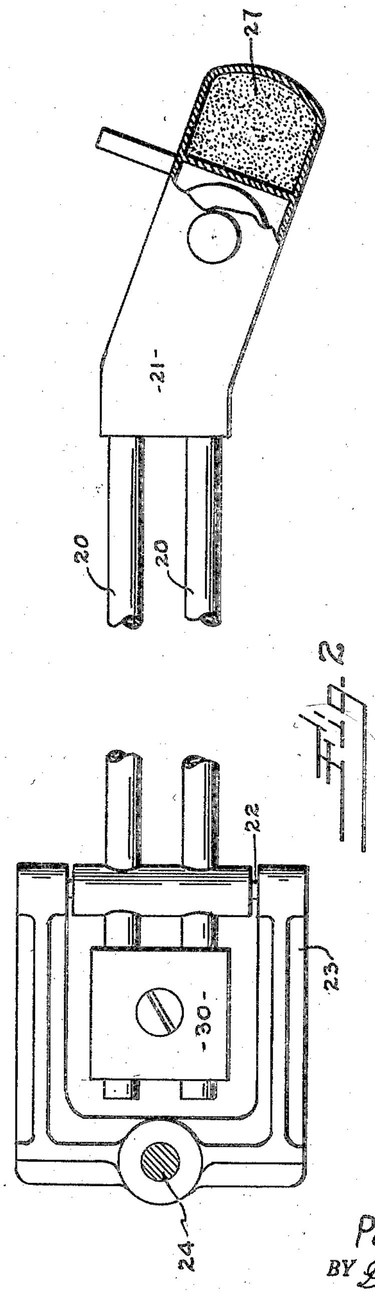
Figure 2 is a top plan view of the pick-up device with parts broken away and parts in section.

The pick-up device consists of a tone arm of any suitable construction, here shown in the form of a pair of rods or tubes 20 extending in parallel relation and having at one end a head portion 21. The arm is mounted intermediate its ends for movement about a horizontal axis 22 carried by a yoke 23 mounted on a vertically extending pivot 24. This pivot is arranged in a supporting bracket 25. The arm is accordingly movable about the horizontal pivot vertically toward and from the record, and the tone arm is movable about the vertical pivot 24 to move the head 21 radially of the record.

The head 21 is provided with the usual electrical pick-up device having a stylus 25a for engagement with the tone grooves of the record. The arm is provided with a mass of powdered or granulated material having a high specific gravity. I have found that powdered tungsten is particularly well adapted for this purpose in that it has an exceptionally high specific gravity and, being in granulated or powdered form, the particles of the material are free to shift among themselves. This action of the material is particularly effective in absorbing vibrations transmitted from the stylus to the arm, and especially at low audio frequencies.

The head portion 21 may be formed with a recess 26 in which the powdered material, indicated at 27, may be positioned and preferably this recess, containing the mass of material, is located outwardly from the stylus 25 relative to the vertical pivot 24.

In the arm construction shown, the rods 20 extend rearwardly from the pivot 22, and a counterweight 30 is mounted on the rearwardly extending portion of the rods and is adjustable toward and from the horizontal pivot 22, this adjustment being such that the stylus 25 exerts only a very slight pressure on the record.

The mass 27 serves to prevent any transverse or vertical movement being transferred from the stylus to the arm, with the result that the stylus is free to follow in the tone groove and will not be dislodged therefrom regardless of the magnitude or frequencies of the undulations in the tone grooves, nor will the arm vibrate when the undulations are at a frequency resonant to the arm.

What I claim is:

1. A pick-up device for record players comprising a supporting member, a tone arm mounted on said support for movement about a horizontal pivot toward and from the record and about a vertical axis radially of the record, a head mounted on the end of the arm remote from said axes and being provided with an electrical pick-up device having a stylus to engage the sound grooves of the record, a mass of shiftable granulated material of high specific gravity carried by said head separate from said pick-up device, and counterbalancing means acting on said arm whereby the arm exerts a slight downward pressure on the stylus.

2. A tone arm structure for record players comprising a supporting member, an arm mounted on said support on a horizontal pivot for movement toward and from the record and about a vertical axis radially of the record, a head portion mounted on the free end of the arm remote from said pivot, said head portion being formed with a recessed compartment and being also provided with an electrical pick-up device, a mass of shiftable powdered material of high specific gravity contained in said compartment, a stylus carried by said pick-up device for engaging the tone grooves of the record, said stylus being located intermediate said mass and said pivot, and counterbalancing means acting on the arm whereby the arm exerts a slight downward pressure on the stylus.

References Cited in the file of this patent

UNITED STATES PATENTS

| | | |
|---|---|---|
| 1,831,787 | Goudy et al. | Nov. 10, 1931 |
| 2,020,139 | Dunning | Nov. 5, 1935 |
| 2,356,467 | Martin | Aug. 22, 1944 |
| 2,357,034 | Thompson et al. | Aug. 29, 1944 |
| 2,506,692 | Thompson | May 9, 1950 |